United States Patent [19]

Bonzo et al.

[11] Patent Number: 5,564,409
[45] Date of Patent: Oct. 15, 1996

[54] APPARATUS AND METHOD FOR WIRE CUTTING GLASS-CERAMIC WAFERS

[75] Inventors: Roy T. Bonzo, Corning; H. Gordon Shafer, Jr., Rock Stream; Jackson P. Trentelman, Painted Post, all of N.Y.

[73] Assignee: Corning Incorporated, Corning, N.Y.

[21] Appl. No.: 469,958

[22] Filed: Jun. 6, 1995

[51] Int. Cl.⁶ .................................................. B28D 1/02
[52] U.S. Cl. ...................... 125/12; 125/16.01; 125/16.02; 492/39; 492/45; 269/47
[58] Field of Search ........................... 125/16.01, 16.02, 125/16, 18, 21, 35; 451/398, 405, 51, 389; 269/47, 48.1–2, 52, 287, 288, 290, 54.1–3, 53; 492/45, 39, 201/412

[56] References Cited

U.S. PATENT DOCUMENTS

| | | | |
|---|---|---|---|
| 1,493,257 | 5/1924 | Garner | 492/45 |
| 1,551,351 | 8/1925 | Wayringer . | |
| 2,311,704 | 2/1943 | Simison . | |
| 3,111,742 | 11/1963 | Lakin | 492/45 |
| 3,157,328 | 11/1964 | Hennings et al. . | |
| 3,167,418 | 1/1965 | Hopkins et al. . | |
| 3,234,830 | 2/1966 | Hess et al. . | |
| 3,241,934 | 3/1966 | Granitsas et al. . | |
| 3,244,776 | 4/1966 | Sheldon . | |
| 3,265,480 | 8/1966 | Hicks, Jr. . | |
| 3,266,961 | 8/1966 | Emels et al. . | |
| 3,275,428 | 9/1966 | Siegmund . | |
| 3,455,667 | 7/1969 | Snitzer et al. . | |
| 3,525,324 | 8/1970 | Bonnefoy | 125/16.01 |
| 3,627,505 | 12/1971 | Engel . | |
| 3,741,739 | 6/1973 | Baker . | |
| 3,762,532 | 10/1973 | Smith | 492/45 |
| 3,771,983 | 11/1973 | Straka . | |
| 3,831,576 | 8/1974 | Mech . | |
| 3,841,297 | 10/1974 | Mech . | |
| 3,942,508 | 3/1976 | Shimizu . | |
| 4,193,783 | 3/1980 | Matsushita . | |
| 4,390,392 | 6/1983 | Robinson et al. . | |
| 4,465,550 | 8/1984 | Lane . | |
| 4,494,523 | 1/1985 | Wells . | |
| 4,655,191 | 4/1987 | Wells et al. | 125/21 |
| 4,693,148 | 9/1987 | Lobley . | |
| 4,903,682 | 2/1990 | Kurokawa | 125/16.01 |
| 5,052,366 | 10/1991 | Matsukura | 125/16.01 |
| 5,097,637 | 3/1992 | Shepherd | 125/16.02 |
| 5,099,820 | 3/1992 | Stricot | 125/16.02 |
| 5,176,728 | 1/1993 | Fugate et al. . | |
| 5,180,469 | 1/1993 | Abe . | |
| 5,201,305 | 4/1993 | Takeucki | 125/16.02 |
| 5,269,285 | 12/1993 | Toyama et al. | 125/16.01 |

FOREIGN PATENT DOCUMENTS

| | | | |
|---|---|---|---|
| 0112754 | 8/1980 | Japan | 125/21 |

OTHER PUBLICATIONS

A. Büttner, et al. "Saw blades", *Industrial Diamond Review* pp. 41–43 (Feb. 1977).
"Auf zu höheren Speicherdichten" *Computertichnik*.
Meyer Burger brochures of DS 260 Wire Saw.
HCT Shaping Systems SA brochure of wire saw cutting technology.
Multi Wire Saw Model MSW–34 (1990).

*Primary Examiner*—D. S. Meislin
*Assistant Examiner*—George Nguyen
*Attorney, Agent, or Firm*—Timothy M. Schaeberle; Edward F. Murphy

[57] ABSTRACT

The present invention relates to an apparatus for cutting a mass of material which includes an elongate wire, a first drive for moving the cutting wire along its length through a cutting location, a rotating mass holder for holding and rotating a longitudinally-extending mass of material about its longitudinal axis, and a second drive. The second drive advances the mass holder and/or the wire toward one another to orient the longitudinal axis of the mass of material at the cutting location in a position perpendicular to the wire to cut the mass of material. Other aspects of the invention include a method of cutting, the mass holder per se.

7 Claims, 9 Drawing Sheets

APPARATUS AND METHOD FOR WIRE CUTTING GLASS-CERAMIC WAFERS

FIELD OF INVENTION

The present invention relates to a method and apparatus for slicing a mass of material into wafers.

BACKGROUND OF THE INVENTION

Generally, a magnetic memory storage device includes the following two component parts: a head pad and a rigid information disk. The head pad supports an element capable of reading or writing data magnetically on the information disk. The information disk itself embodies two basic components—specifically, a rigid substrate with a coating of magnetic media on its surface.

Today's market for rigid magnetic storage is well established and growing, with even greater advances being foreseen through the utilization of thin film media technology. Increased information densities, higher disk rotation speeds, and lower head flying heights not only afford greater efficiencies in data storage and retrieval, but also demand extremely tight tolerances to be held in the substrate specifications for flatness, rigidity at high rotational velocities, and surface texture. Therefore, the substrate must be produced with sufficient surface flatness and smoothness so that it can cope with the recent requirement for high density recording necessitated by the desire for increased information per unit of surface area. Where the product is designed for the high performance market, high capacity and rapid access characteristics are key requirements. Moreover, the current trend toward small disk drives and less powerful motors, particularly for the rapidly developing markets for slimline and portable drives, calls for thin, lightweight, rugged disks that have high functional densities and area capable of withstanding frequent takeoffs and landings with no deterioration in performance.

Research has been ongoing to discover materials which would satisfy these enhanced requirements. Glass substrates, specifically chemically tempered glass, have been used in the art. However, this material possesses a number of shortcomings which limit its utility. Recently, research has led to the development of glass-ceramic materials suitable for use as substrates in magnetic memory devices. These suitable glass-ceramic materials include glass-ceramics containing lithium disilicate, canasite, or fine grained spinel-type crystals.

An important step in the production of low cost substrates suitable for magnetic memory disks is cutting the materials into the desired shapes. As discussed above, it is necessary for the cutting method to produce a product which is flat and smooth. As is well known, the glass-ceramic substrates are used in the form of a thin wafer. The glass-ceramic wafers are obtained by slicing a mass of material with a cutting device.

A variety of saws for slicing brittle materials into wafers have been developed. For example, in the semi-conductor industry, it is well-known to use annular saws, i.e. I.D. saws; to produce silicon wafers. In this method, an internally bladed slicing machine is equipped with a wheel, which is a thin plate of stainless steel in annular form and having a thickness of a few hundred micrometers. Fine diamond particles of 40 to 60 μm diameter are electrodeposited on and imbedded in the internal periphery of the annular plate to form a cutting blade. A single crystal of silicon is cut by putting it under adequate contacting force at the diamond blade of the annular plate, which is rotating at a high velocity, under tension in the radial direction. As a result, the diamond particles grind off the single crystal material to produce a wafer.

This method has several disadvantages. Firstly, there is likely to be a loss of material corresponding to the thickness of the cutting blade. Secondly, such a mechanical cutter is likely to form a warped wafer surface. Accordingly, subsequent finishing or lapping is required to improve the flatness of the wafer. Wire saws were also developed for cutting brittle materials. U.S. Pat. Nos. 3,831,576 and 3,841,297 to Mech disclose a wire saw for cutting brittle materials such as quartz and ceramics. The machine includes a web of wires defining a cutting area formed by winding a continuous strand of wire around a number of elongated spaced-apart pulleys. The material to be cut is mounted in a fixed position on a mounting apparatus and is moved by the mounting apparatus into the cutting area for engagement with the wires. A cutting mixture, i.e., a slurry containing fine particles of cutting material and a viscous carrier, is applied to the cutting area. Similar wire saws are also disclosed in U.S. Pat. No. 3,942,508 to Shimizu and U.S. Pat. No. 4,494,523 to Wells.

Conventional wire saws suffer from a number of disadvantages. The use of a web of wires can produced sliced wafers of variable and inconsistent thickness due to wandering of the individual wires as they proceed through the material. In addition, such wire movement produces wafers with an unsuitable curvature. Further, changes in the tension and speed of the wire produce inconsistencies in the surface of the wafer. Accordingly, expensive subsequent finishing work, such as lapping, is required to improve the flatness and smoothness of the wafer surface. This greatly increases the cost of the parts being produced and results in material loss. In addition, some waists produced may be curved to such a degree that lapping is unable to produce flat surfaces. Another disadvantage of wire saws is that low cutting speeds must be used for brittle materials. Lastly, wire saws have high operating costs, with the wire and slurry generally being the largest cost components.

The present invention is directed to overcoming these deficiencies.

SUMMARY OF THE INVENTION

The present invention relates to an apparatus for cutting a mass of material which includes an elongate cutting wire. A first drive moves the cutting wire along its length through a cutting location. A rotating mass holder holds and rotates a longitudinally-extending mass of material which rotates about its longitudinal axis. A second drive advances either the mass holder toward the wire, the wire toward the mass holder, or both the mass holder and the wire toward one another. This orients the longitudinal axis of the mass of material at the cutting location in a position perpendicular to the wire to cut the mass of material.

Another aspect of the present invention relates to a method for cutting a mass of material having a longitudinal axis. An elongate cutting wire is moved along its length through a cutting location. The method then involves advancing either the mass of material toward the wire, the wire toward the mass of material, or both the wire and the mass of material toward one another. This orients the longitudinal axis of the mass of material at the cutting location in a position perpendicular to the wire for cutting the mass of material. The mass of material is rotated around its longitudinal axis so that it is cut.

Another aspect of the present invention relates to a work holder for rigidly holding material to be cut. The work holder includes a longitudinally-extending arbor which has an exterior surface with a plurality of pins extending outwardly from the exterior surface. There is also a sleeve configured to surround and slidably receive the arbor, and having a longitudinally-extending space to receive the plurality of pins. The space and pins interact to prevent relative rotation between the arbor and the sleeve.

DETAILED DESCRIPTION OF THE DRAWINGS AND THE INVENTION

The present invention relates to an apparatus for cutting a mass of material which includes an elongate cutting wire. A first drive moves the cutting wire along its length through a curing location. A rotating mass holder holds and rotates a longitudinally-extending mass of material which rotates about its longitudinal axis. A second drive advances either the mass holder toward the wire, the wire toward the mass holder, or both the mass holder and the wire toward one another. This orients the longitudinal axis of the mass of material at the curing location in a position perpendicular to the wire to cut the mass of material.

Another aspect of the present invention relates to a method for cutting a mass of material having a longitudinal axis. An elongate cutting wire is moved along its length through a cutting location. The method then involves advancing either the mass of material toward the wire, the wire toward the mass of material, or both the wire and the mass of material toward one another. This orients the longitudinal axis of the mass of material at the cutting location in a position perpendicular to the wire for cutting the mass of material. The mass of material is rotated around its longitudinal axis so that it is cut.

Another aspect of the present invention relates to a work holder for rigidly holding material to be cut. The work holder includes a longitudinally-extending arbor which has an exterior surface with a plurality of pins extending outward from the exterior surface. There is also a sleeve, configured to surround and slidably receive the arbor, and having a longitudinally-extending space to receive the plurality of pins. The space and pins interact to prevent relative rotation between the arbor and the sleeve.

Figure 1:
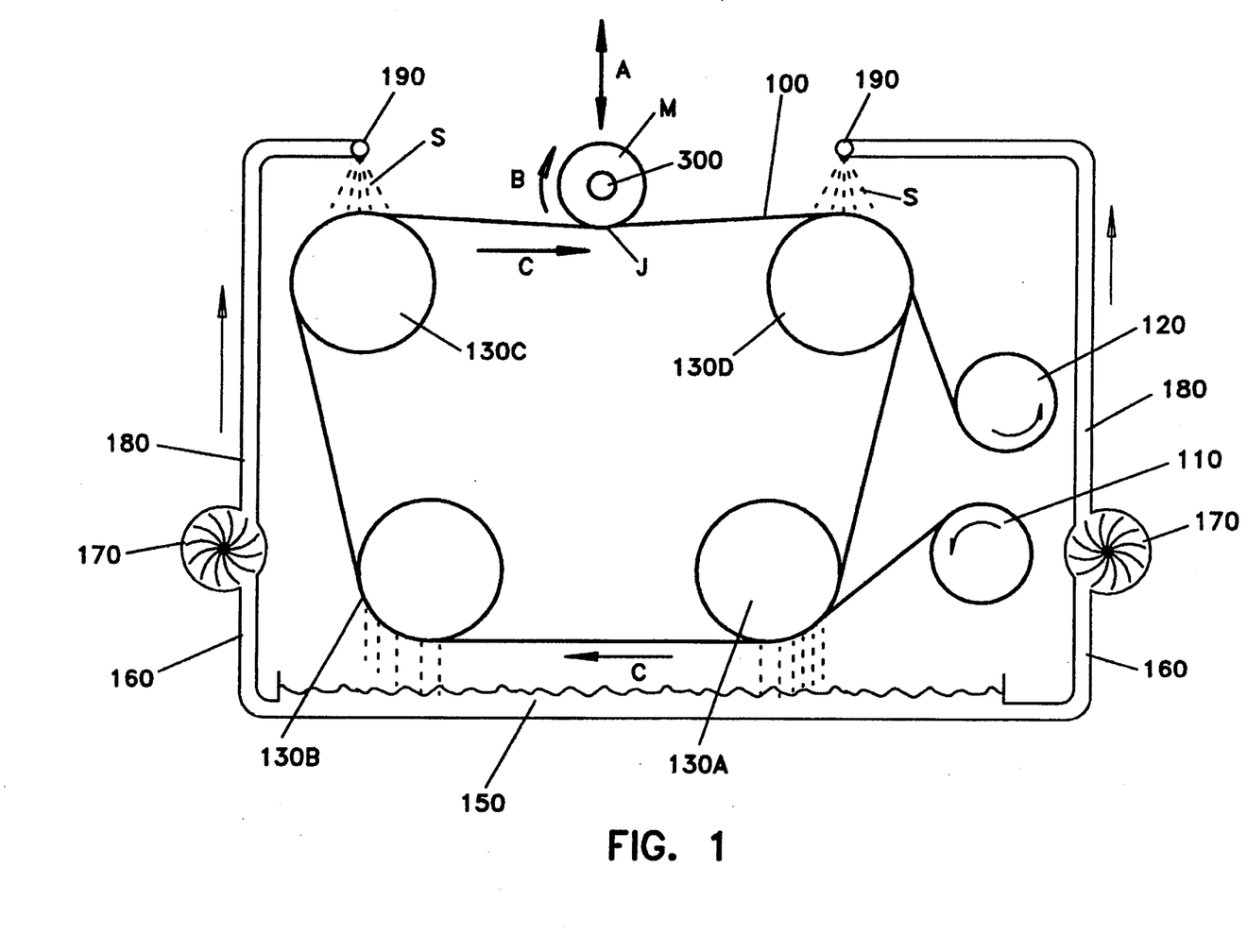
FIG. 1 is a schematic view of one embodiment of an apparatus in accordance with the present invention.
Figure 2:
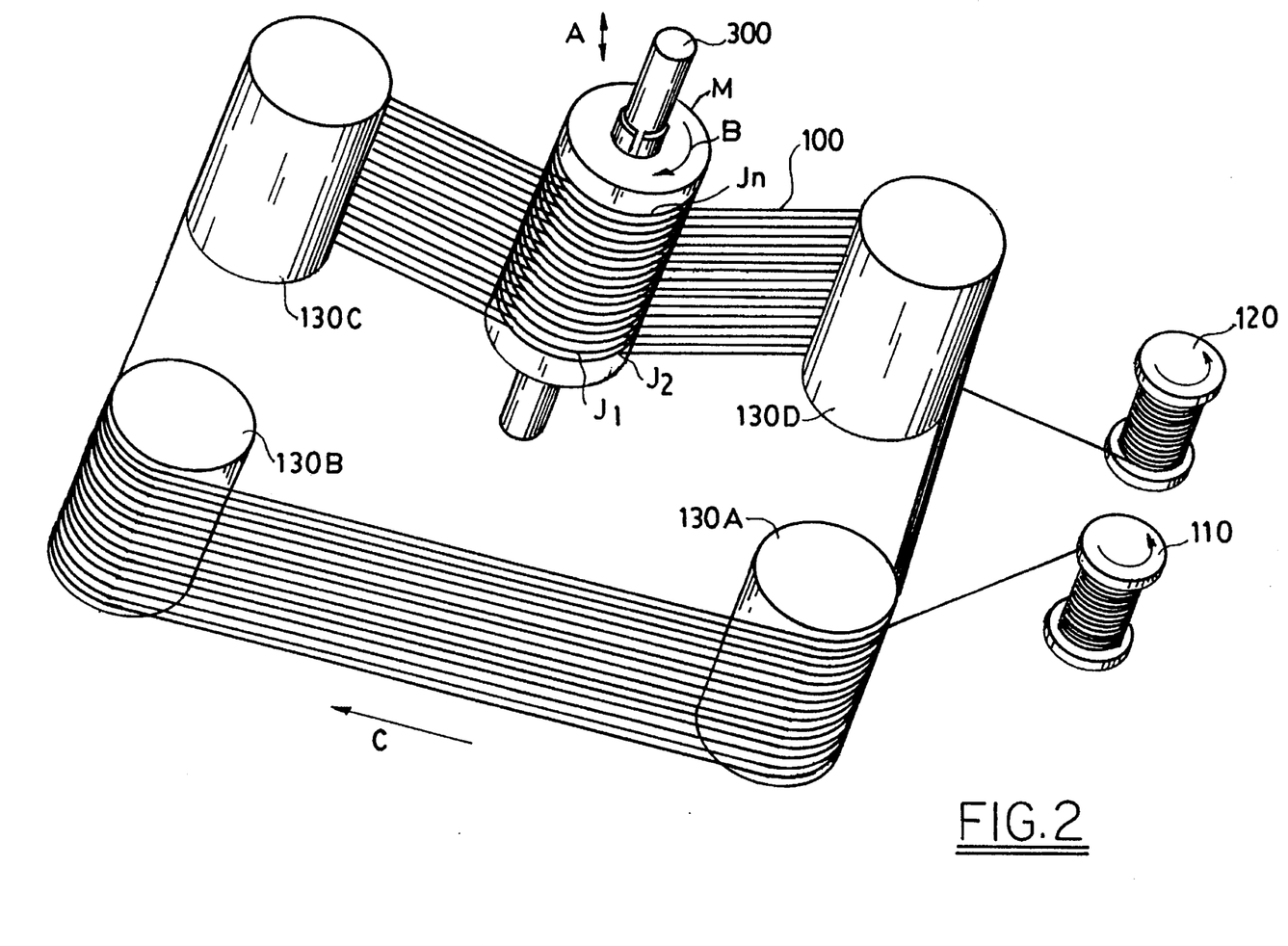
FIG. 2 is a perspective view of a portion of the apparatus of FIG. 1.
Figures 5, 7, 8, 9:
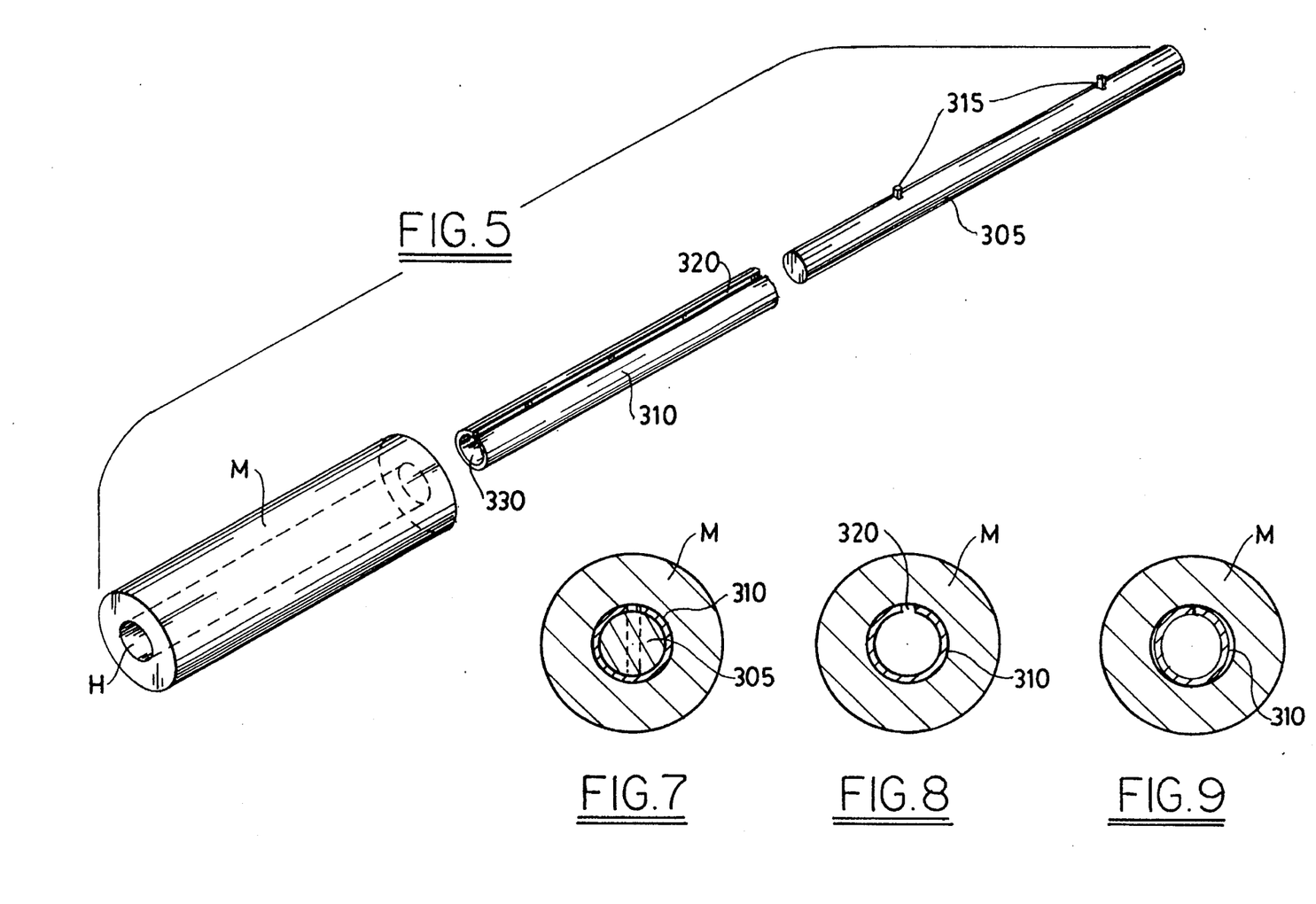
FIG. 5 is an exploded, perspective view of the work holder of the present invention.
FIG. 7 is a cross-sectional view of the work holder of FIG. 6.
FIG. 8 is a cross-sectional view of the work holder of FIG. 6.
FIG. 9 is a of cross-sectional view of the work holder of FIG. 6.
Figure 6:
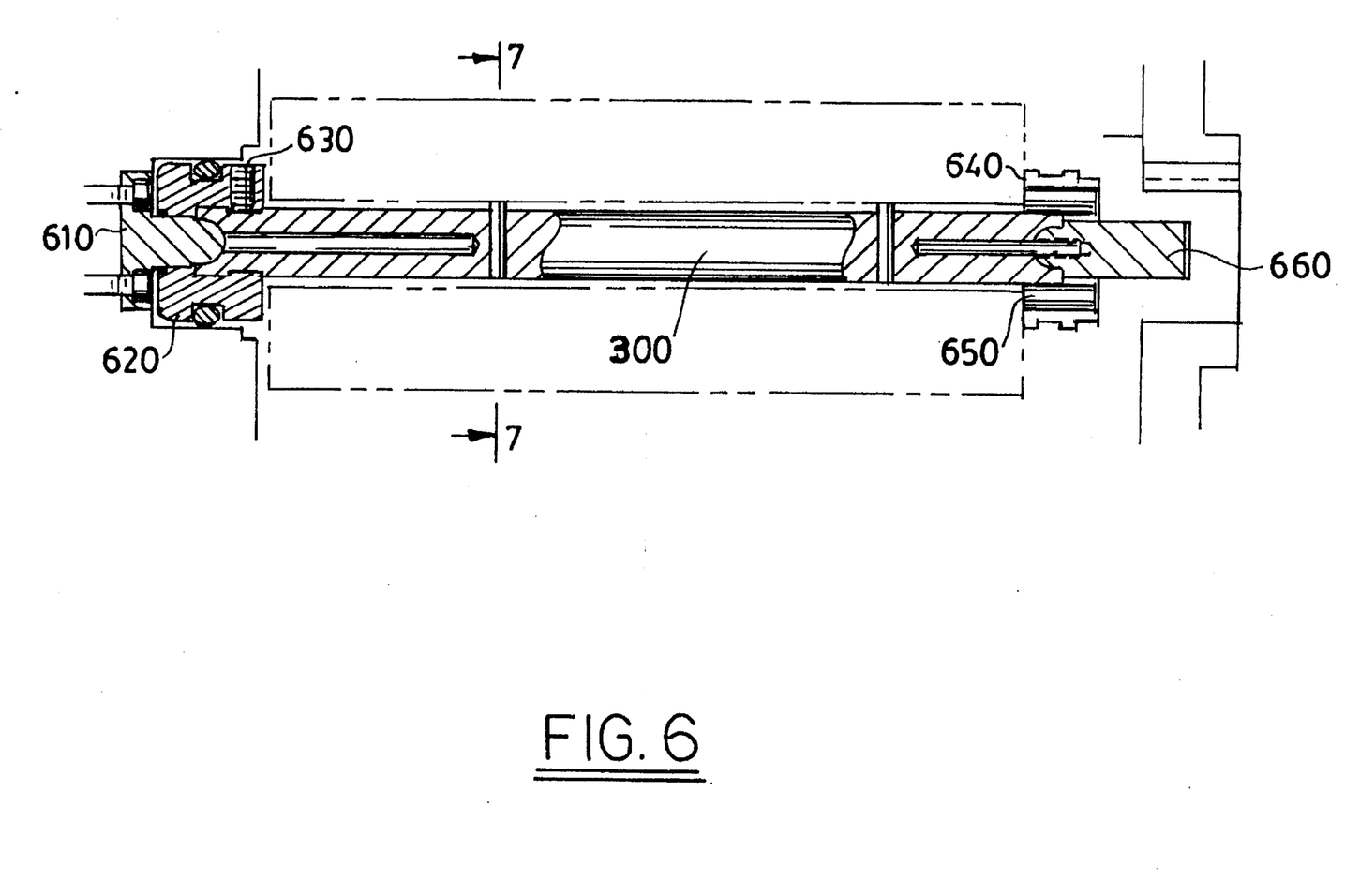
FIG. 6 is a side cross-sectional view of the work holder of FIG. 5.

FIG. 1 is a schematic view of one embodiment of an apparatus in accordance with the present invention. As shown in FIG. 1, wire 100 is discharged from feed spool 110, winds around a plurality of guide rollers 130A–D, and is received by take-up spool 120. A mass of material M to be cut is positioned against and above wire 100 between guide rollers 130C and 130D at cutting location J. This is shown in more detail in FIG. 2 which is a perspective view of a portion of the apparatus of FIG. 1. In addition, FIG. 2 shows that wire 100 is wound around rollers 130A–D a plurality of times between the point at which the wire is discharged from feed spool 110 and received by take-up spool 120. Each point at which wire 100 contacts/cuts mass M is a cutting location J. The cutting locations in FIG. 2 range from $J_1$ to $J_n$ with n corresponding to the number of cutting locations and n+1 corresponding to the number of pieces mass M is cut into. It should be noted, however, that the pieces of mass M formed outside of locations $J_1$ and $J_n$, as a result of cutting, are not useful and are discarded. As shown in both FIGS. 1 and 2, mass of material M is mounted on mass holder 300 for cutting. Further details concerning the mass holder are depicted in FIGS. 5 and 6, discussed infra.

As shown in FIGS. 1 and 2, mass M and wire 100 have a number of components of movement. Mass M can be transversely advanced toward and retracted from wire 100, at cutting location J, along arrow A to move the mass into a position to be cut or to retract it from such a cutting position, respectively. In addition, mass M is mounted for rotation about the longitudinal extent of mass holder 300. Preferably, such rotation is in the direction shown by arrow B. Alternatively, mass M can be rotated in a direction opposite that of arrow B. However, to facilitate cutting, it is desirable for the sense and/or magnitude of rotation of mass M, at cutting location J, to differ from that of wire 100 at cutting location J. Preferably, this is achieved by rotating mass M in a direction defined by arrow B, at cutting location J, which is opposite to the direction of movement of wire 100 defined by arrow C at cutting junction J.

As also shown in FIG. 1, it is desirable to apply a slurry S of cutting material to wire 100 to facilitate cutting of mass M. The slurry is withdrawn from reservoir 150 through feed conduits 160 by pumps 170. Pumps 170 convey the slurry from discharge conduits 180 to fluid discharge manifolds 190. Fluid discharge manifolds 190 apply slurry S to wire 100 with excess slurry S collecting in reservoir 150 for subsequent use. The slurry includes a cutting material made up of relatively fine abrasive particles, such as silicon carbide or the like, and a fluid carrier, such as glycerine, water, or oil.

Figure 3:
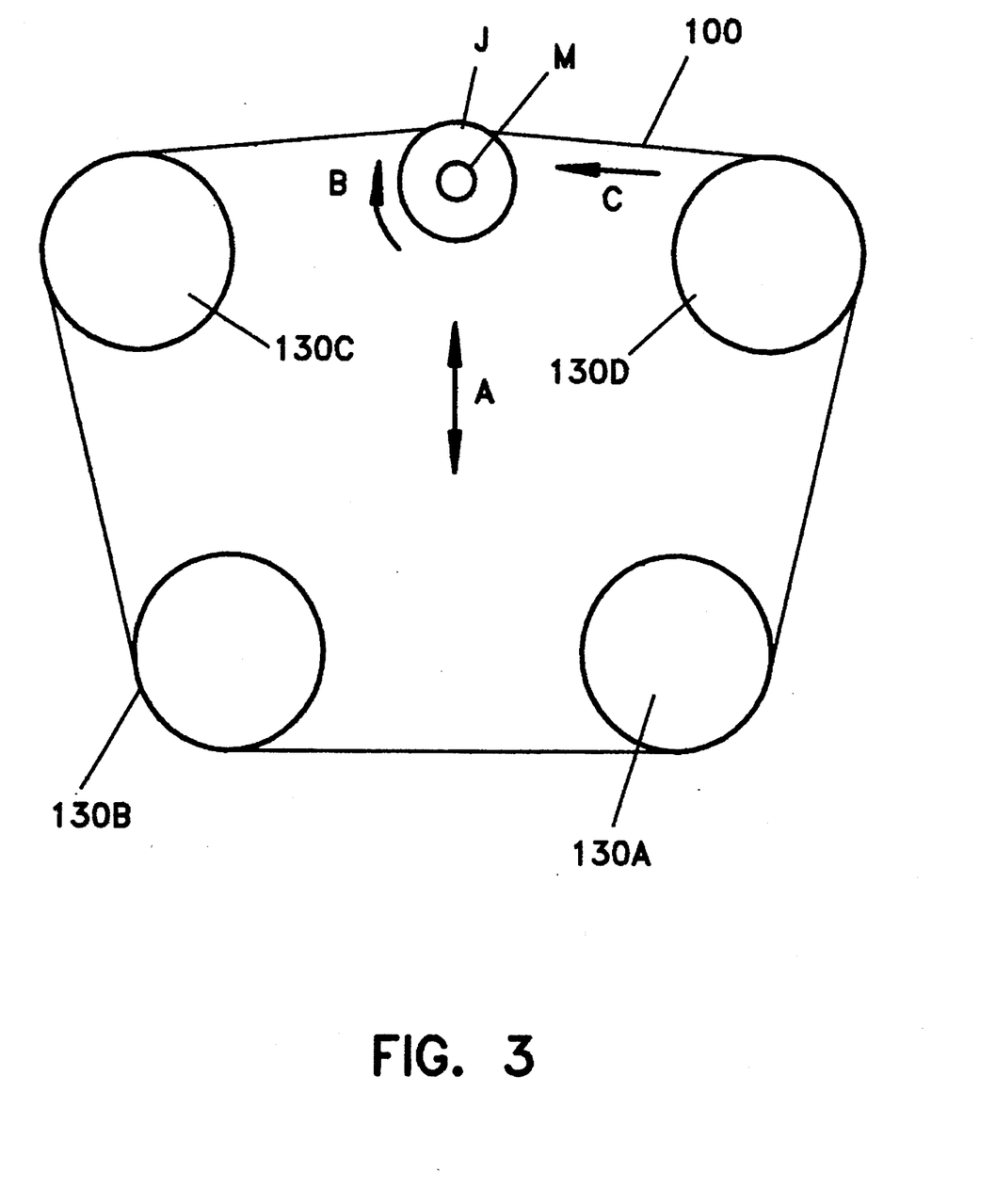
FIG. 3 is a schematic view of another embodiment of the apparatus of the present invention.
Figure 4:
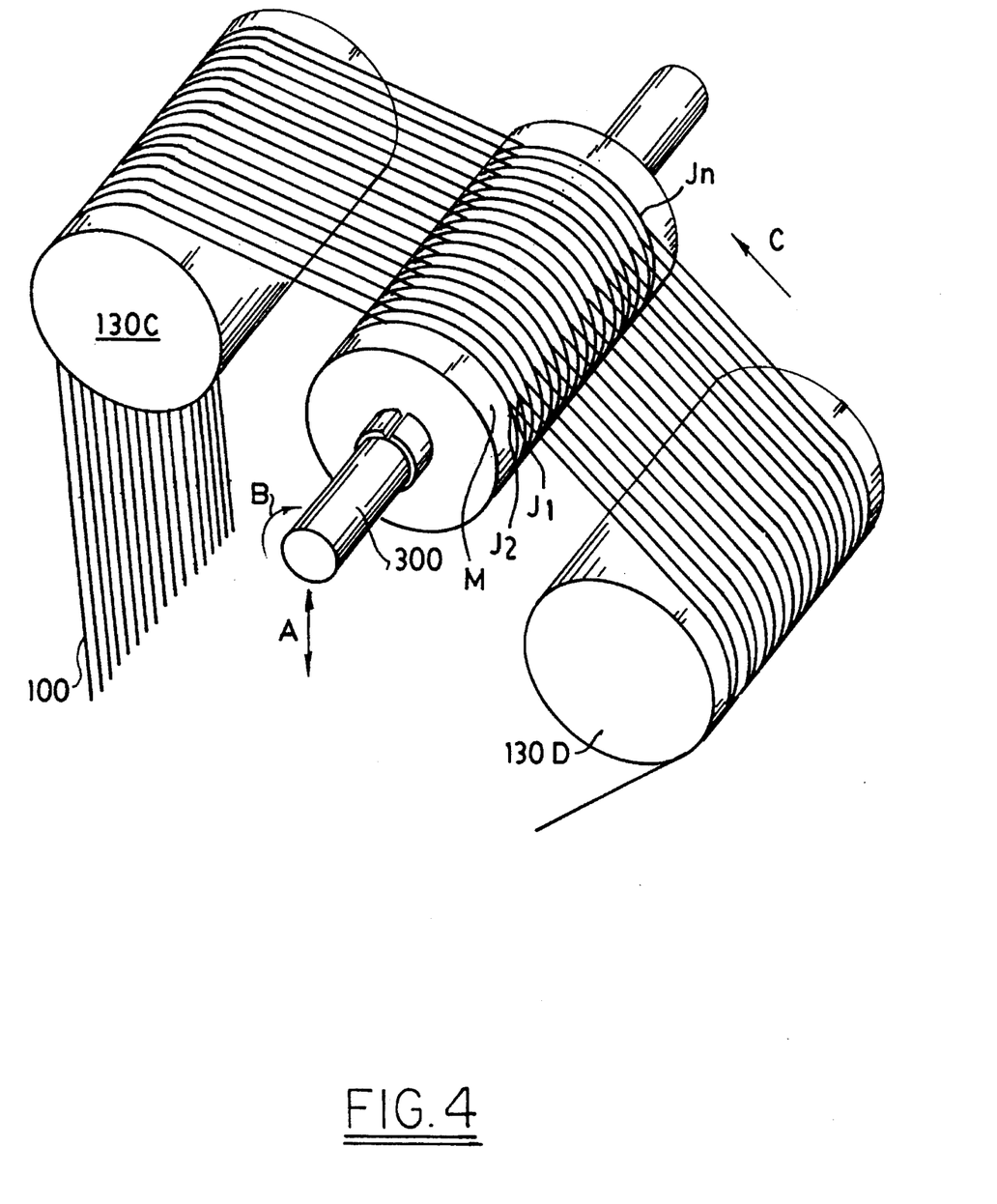
FIG. 4 is a perspective view of a portion of the apparatus of FIG. 3.

FIG. 3 is a schematic view of another embodiment of an apparatus in accordance with the present invention. FIG. 4 is a perspective view of a portion of the apparatus of FIG. 3. FIGS. 3 and 4 show sufficient details of this embodiment to distinguish it from the embodiment of FIGS. 1 and 2. In all other respects, these embodiments are the same and FIGS. 1 and 2 should be referred to for further details of the apparatus of FIGS. 3 and 4.

As shown in FIG. 3, wire 100 is wound around a plurality of guide rollers 130 A–D. Mass of material M to be cut is positioned against and below wire 100 between guide roller 130C and 130D. This is contrary to the embodiment of FIGS. 1 and 2 where mass M is positioned above wire 100. As shown in FIG. 4, wire 100 is wound around rollers 130 A–D a plurality of times. Each point at which wire 100 contacts/cuts mass M is a cutting location J. The cutting locations in FIG. 4 range from $J_1$ to $J_n$ with n corresponding to the number of cutting locations and n+1 corresponding to the number of pieces mass M is cut into.

As shown in FIGS. 3 and 4, mass M and wire 100 have a number of components of movement. Mass M can be transversely advanced toward and retracted from wire 100, along the path defined by arrow A, to move the mass into a position to be cut or to retract it from such a cutting position, respectively. In addition, mass M is mounted for rotation about the longitudinal extent of work holder 300 in the direction shown by arrow B. Alternatively, mass M can be rotated in a direction opposite that of arrow B. However, to facilitate cutting, it is desirable for the sense and/or magnitude of rotation of mass M at cutting location J, corresponding to arrow B, to differ from that of wire 100 at cutting junction J, defined by arrow C.

Wire 100 typically has a diameter of 0.150 to 0.175 mm. The material used to form the wire is typically high carbon steel.

Wire 100 is wound around the plurality of guide rollers 130A–D a plurality of times, up to several hundred times depending on part thickness. Each of guide rollers 130A–D has a plurality of grooves in its outer surface for aligning the wire 100.

Both feed spool 110 and take-up spool 120 include a drive shaft (not shown) connected to a drive motor (not shown) for rotation thereof. The drive motors are generally energized and controlled to maintain a substantially constant movement of the wire 100. Generally, such movement is at a wire speed of 3 to 10 m/sec. Further, it is desirable to maintain a substantially constant tension on the wire between the spools 110 and 120. Typically, a wire tension of 20 to 35 Newtons is used with 25 to 30 Newtons being particularly desirable.

It may also be desirable periodically to reverse the direction of movement of the wire at cutting location J to produce a sawing action. In this mode of operation, wire 100 moves continuously from feed spool 110 to take-up spool 120 at a substantially constant rate even though the direction of movement of the wire 100 is periodically reversed. Thus, new wire is continually supplied to the first cutting junction.

Alternatively, wire 100 can be directed in a one way wire management scheme where the wire's direction of movement at the cutting location is not reversed. Instead, wire 100 is moved around guide rollers 130A–D in a constant direction, and new wire is supplied to the cutting location at a constant rate.

Further details regarding wire saws, albeit having stationary work as opposed to oscillating or rotating work, are well known to those of ordinary skill in the art. For example, see U.S. Pat. Nos. 3,831,576 and 3,841,297 to Mech, U.S. Pat. No. 3,942,508 to Shimizu, and U.S. Pat. No. 4,494,523 to Wells, which are hereby incorporated by reference.

A preferred embodiment of work holder 300 is shown in FIG. 5. As shown, mass holder 300 includes a longitudinally-extending arbor 305 having an exterior surface. A plurality of pins 315 extend outwardly from the exterior surface of arbor 305. Sleeve 310 has a hollow interior 330 configured to receive and to surround the exterior surface of arbor 305. Sleeve 310 has longitudinally-extending space 320 to receive the plurality of pins 315 which extend outwardly from the exterior surface of arbor 305. As a result, when arbor 305 is fitted within hollow interior 330 of sleeve 310, pins 315 prevent relative rotation between arbor 305 and sleeve 310.

Mass of material M is somewhat rigidly fixed to arbor 305 for rotation by use of sleeve 310. Some axial and longitudinal play is present between mass of material M and arbor 305. More particularly, mass M has a hollow longitudinally-extending shaft H to receive sleeve 310. Mass M is attached to sleeve 310 with an adhesive. It is particularly preferred to use a two-part epoxy which extends throughout the surface of mass M defining shaft H. The diameter of sleeve 310 is less than the diameter of shaft H of mass M.

An example of a system for rotating mass holder 300 is illustrated in FIG. 6. Mass holder 300 is mounted for rotation by mounting one end of the work holder against stationary center 660 by collar 620. Mass holder 300 is positioned at stationary center 660. When the embodiment of mass holder 300 is as shown in FIG. 5, arbor 305 is positioned at stationary center 660 by collar 620, and sleeve 310 is held in position by set screws 630. The opposite end of mass holder 300 is equipped with flange 640 complete with plurality of alignment pins 650. A plurality of alignment pins 650 position mass holder 300 in rotating center 660. Rotating center 610 is rotated by a drive (not shown) which can be directly connected to rotating center 610. Alternatively, the drive can be connected to rotating center through a number of intermeshing gears (not shown).

Once mass holder 300, including sleeve 310 and arbor 305, are inserted into shaft H of mass M, mass M is fixed to mass holder 300 for rotation. It is contemplated that this arrangement would allow some relative axial and longitudinal movement between sleeve 310 and arbor 305. This is depicted in the cross-sectional illustration of FIG. 7. Following cutting of mass M, the resulting wafers remain fixed to sleeve 310 by the previously-applied adhesive. To remove the wafers, arbor 305 is removed from sleeve 310, as illustrated in FIG. 8. The disks are then removed from sleeve 310 by pressing toward one another the longitudinally-extending surfaces defining space 320 to narrow the circumferential extent of space 320 (i.e., sleeve 310 is crimped), as illustrated in FIG. 9. By so reducing the circumference of sleeve 310, the wafer disks can easily be slipped off of sleeve 310. The longitudinally-extending surfaces defining space 320 are normally from 0.2 to 0.6 cm apart, preferably 0.3 cm, absent crimping. Sleeve 310 must be thin enough so that it can effectively be crimped, must not break wire 100 once it cuts through mass of material M and contacts the sleeve, and must be thick enough so that wire 100 will not cut through the sleeve and reach arbor 305. Sleeve 310 has a thickness from 1 to 1.6 mm, preferably 1.5 mm.

In operation, as shown in FIGS. 1 and 2, mass M is mounted for rotation about the longitudinal extent of mass holder 300. Mass M can be of any shape; however, it is desirable for mass M to be a cylindrical boule. Mass M is moved against wire 100 along the path defined by arrow A, to form a cutting location J where wire 100 contacts mass M. Mass M is then cut by rotating it along the path defined by arrow B while transversely moving wire 100 along the path defined by arrow C. During such cutting, slurry S of curing material is withdrawn by pumps 170 from reservoir 150, passed through feed conduits 160 and discharge conduits 180, and applied to wire 100 by spray nozzle 190. Once cutting is completed, mass M can be retracted from the cutting position by moving it along the path defined by arrow A away from wire 100. The resulting wafers can then be removed from sleeve 310. The embodiment of FIGS. 3 and 4 can be operated in a substantially similar fashion.

The apparatus of the present invention is particularly suitable for slicing glass-ceramic materials, specifically those glass-ceramics containing spinel, lithium disilicate or sappharine crystals, as well as any other glass-ceramic material suitable for use as magnetic memory disk substrates.

Glass-ceramics comprised predominately of generally uniformly-sized spinel-type crystals uniformly dispersed within a highly siliceous residual glass matrix phase are disclosed in greater detail in U.S. patent application Ser. No. 08/332,703 to Beall et al., which is hereby incorporated by reference. The composition of these glass-ceramic articles expressed in terms of weight percent on the oxide basis, includes: 35–60% $SiO_2$, 20–35% $Al_2O_3$, 0–25% MgO, 0–25% ZnO, at least about 10% MgO+ZnO, 0–20% $TiO_2$, 0–10% $ZrO_2$, 0–2% $Li_2O$, and 0–8% NiO. However, if the $Al_2O_3$ constituent is present in an amount less than about 25%, the $TiO_2+ZrO_2+NiO$ amount should be at least 5%. The composition may also contain up to 5% of optional constituents, such as BaO, CaO, PbO, SrO, $P_2O_5$, $B_2O_5$, $Ga_2O_3$, 0–5% $R_2O$, or 0–8% of a transition metal oxide; the $R_2O$ can be $Na_2O$, $K_2O$, $Rb_2O$ or $Cs_2O$.

Glass ceramics exhibiting a crystal phase assemblage comprised predominately of a mixture of lithium disilicate and tridymite uniformly interspersed with a residual glass phase and forming an interlocked microstructure with the glass are disclosed in U.S. patent application Ser. No. 08/265,192 to Beall et al., which is hereby incorporated by reference. The composition, expressed in terms of weight percent on the oxide basis, includes 75–95% $SiO_2$, 3–15% $Li_2O$, 0–6% $Al_2O_3$, and 0–6% $K_2O$. The nucleating agent for this glass-ceramic can be 0–0.1% Pd or 0–5% $P_2O_5$; however, if Pd is absent, the $P_2O_5$ amount is at least 0.5% and, if $P_2O_5$ is absent, then the Pd amount is at least 0.005%. Additionally, up to 15% of optional ingredients may be added, including $B_2O_3$, $Na_2O$, ZnO, MgO, CaO, SrO, $ZrO_2$, $TiO_2$, F, $Sb_2O_3$, $As_2O_3$, PbO, and BaO.

Glass-ceramics containing a crystal phase assemblage comprised predominantly of a mixture of uniformly distributed sapphirine ($4MgO\cdot5Al_2O_3$—$SiO_2$) and α-quartz crystals exhibiting a crystal/grain size of less than about 1000 Å are disclosed in U.S. patent application Ser. No. 08/332,704 to Beall et al, which is hereby incorporated by reference. The precursor glass exhibits a composition, expressed in terms of weight percent on the oxide basis, includes: 46–52% $SiO_2$, 23–28% $Al_2O_3$, 12–16% MgO, 0.5–3% $B_2O_3$, 0–5% ZnO, a nucleating agent which can be 5–12% $TiO_2$ or 0–5% $ZrO_2$, and up to 6% of optional ingredients; no more than 3% of the optionals may be alkali oxides.

The glass-ceramic wafers produced by the cutting apparatus of the present invention have an exterior surface with a average flatness of 3 to 10 microns and an axisymmetric shape, having a thicker middle and thinner edges.

The flatness of these wafers can be further improved to an average flatness of 1 to 3 microns by lapping the cut wafers.

EXAMPLES

Example 1

Experiments were undertaken to compare the characteristics of a conventional wiresaw cutting process with a stationary workpiece versus a wiresaw cutting process with a rotating workpiece. The tests were performed using a G300 wiresaw manufactured by HCT Shaping Systems SA of Switzerland fitted with a workpiece rotator.

The mass of material being sliced was a glass-ceramic containing canasite crystals ("canasite") of a composition as described above. This mass of material was formed by melting the desired batch of glass-ceramic precursor glass and thereafter forming the melt into a cylindrical boule.

It was discovered that the differences between a conventional wiresaw cutting process with a stationary workpiece and a wiresaw cutting with rotating workpiece manifested themselves in the following areas: a) cut rate; b) part dimensional variation; c) part shape and subsequent ability to be lapped flat; d) slurry usage/piece; e) wire usage/piece; f) surface finish; g) sensitivity to alignment; and h) sensitivity to thermal effects. Also, sensitivity to rotational speed and direction is discussed.

Cut Rate

In a conventional process, the fastest cut rate for canasite in any practical, repeatable sense was 120–135 minutes for a round 65 mm diameter workpiece with a 19 mm diameter central bore. This was at a wire tension of 30N and a wire speed of 10 m/s. The range of cut times reflect the various slurry conditions which were used during the experiment. In all cases, the slurry included SiC grit of 13–15 μm mean particle size and an oil carrier (as opposed to water).

In wiresaw cutting with rotating workpiece, under the same process conditions and with the same slurry, cut times for the same product were consistently 60–70 minutes.

Part Dimensional Variation

In a conventional process, dimensions of the sliced wafer, as characterized by total thickness variations ("TTV") and flatness of each side, are strongly influenced by slurry age and cut rate. At the process parameters defined above, TTV and flatness of the wafers showed continual degradation with slurry life and the distribution of TTV and flatness for wafers created within a run always had "fliers," i.e., wafers which skewed the distribution. These fliers strongly influenced the standard deviation values which characterize the distributions. The presence of fliers and the characteristic shape of the distributions typify cutting canasite with the wiresaw process, regardless of general process conditions. Typical values of TTV and flatness at various points over the life of a batch of slurry are shown in Table 1 below.

TABLE 1

| SLURRY AGE | TTV ± σ(μm) | AVG. FLATNESS ± σ(μm) |
|---|---|---|
| New | 18 ± 6 | 24 ± 9 |
| 1000 PCS | 31 ± 19 | 42 ± 23 |
| 2000 PCS | 42 ± 31 | 36 ± 13 |

Numbers were generated using a 12 point Linear Variable Differential Transducer ("LVDT") mechanical gauge.

In wiresaw cutting with a rotating workpiece, sliced wafers have TTV and flatness distributions of an entirely different character. The distributions were tighter, and fliers were typically not found. The few fliers that were observed had an assignable cause. In addition, no degradation of TTV and/or flatness was observed with slurry life under any conditions tested. Data for TTV and flatness using wiresaw slicing with rotation is shown in Table 2 below.

TABLE 2

| SLURRY AGE | TTV ± σ(μm) | AVG. FLATNESS ± σ(μm) |
|---|---|---|
| New | 8 ± 3 | 8 ± 3 |
| 1000 PCS | 10 ± 2 | 6 ± 2 |
| 2000 PCS | 11 ± 3 | 4 ± 2 |

TABLE 2-continued

| SLURRY AGE | TTV ± σ(μm) | AVG. FLATNESS ± σ(μm) |
|---|---|---|
| 3000 PCS | 11 ± 6 | 6 ± 7 |
| 4000 PCS | 11 ± 5 | 6 ± 2 |
| 5000 PCS | 13 ± 4 | 10 ± 7 |

Numbers were generated using a 12 point Linear Variable Differential Transducer ("LVDT") mechanical gauge.

Part Shape and Subsequent Ability to Be Lapped Flat

In a conventional process, variation of surface topography is attributable to wire wander during cutting, as well as to wire wear. Consequently, most surfaces produced vary in the direction of cut but not parallel to the wires. This produces a "potato chip" shape, often with a dramatic entrance or exit effect. This shape gives the part compliance under the pressure of lapping and makes it difficult to lap these parts flat without undue stock removal.

Figure 10A:
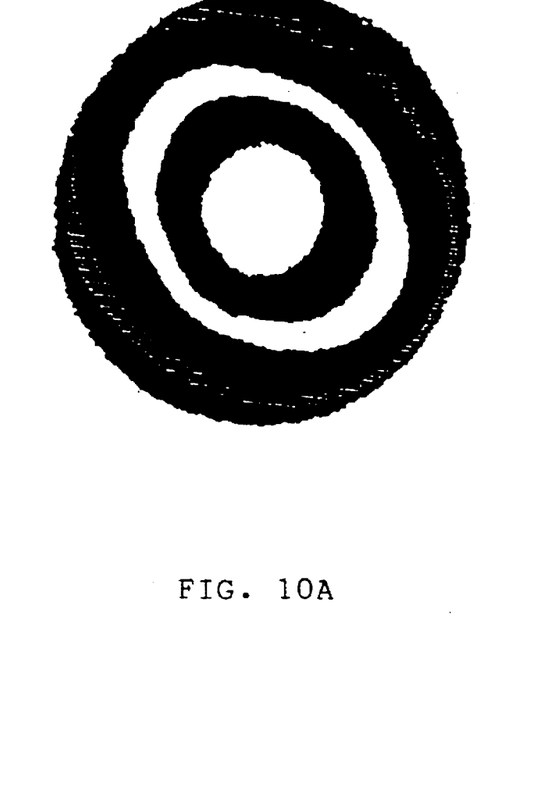
FIGS. 10A and B are, respectively, top and perspective views of a Tropel measurement of the surface flatness of a wafer produced in accordance with the present invention.
Figure 10B:
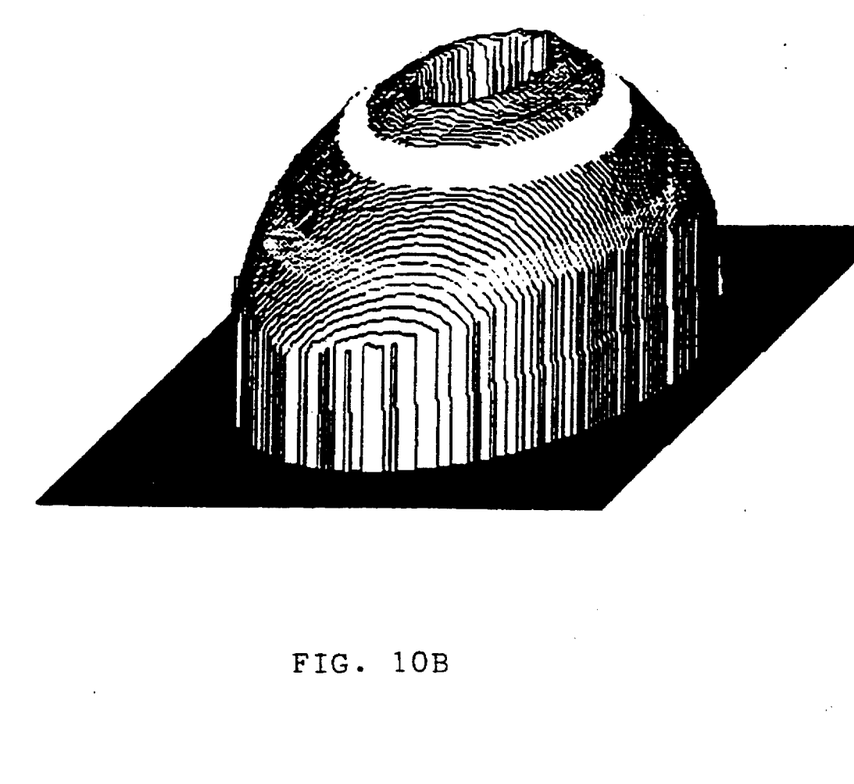

In wiresaw cutting with a rotating workpiece, parts are characterized by an axisymmetric shape which is to be expected considering the nature of the process. Parts are typically thin on the edge and thicker towards the middle. FIGS. 10A and B, respectively, illustrate a top and perspective view of a Tropel measurement. A Tropel measurement is an interferometric scan from which flatness of the wafer can be deduced. The Tropel measurement of a wafer produced by this process shows that the wafer has a thicker middle and thinner edges. Post-lap measurements with TROPEL for conventional and rotated parts produced the following results:

Post-lapped flatness (conventional): 4–8 μm

Post lapped flatness (wiresaw cutting with rotation): 1–2 μm

Slurry Usage

In a conventional process, as shown above in Table 1, TTV and flatness fall off as the slurry ages. The slurry life depends upon part requirements for lapping.

In wiresaw cutting with a rotating workpiece, since it was shown that dimensions are not affected by slurry life, the slurry life depends upon what can be tolerated relative to cut rate degradation and cleanliness requirements. This makes slurry life comparisons between conventional wiresaw cutting and wiresaw cutting with a rotating workpiece difficult, if not impossible. For particular glass-ceramic products, wiresaw cutting with a rotating workpiece produced a product which could be successfully lapped to the required flatness of 1–2 μm. The conventionally-sliced product could not be lapped to this flatness.

Wire Usage

Wire usage for the two processes can be compared directly with reasonable precision by running to the same exit wire diameters for each process. Observations show the following wire usage per piece for each process.

Conventional=50 meters

Wiresaw Cutting with a Rotating piece=35 meters

Surface Finish

Figure 11:
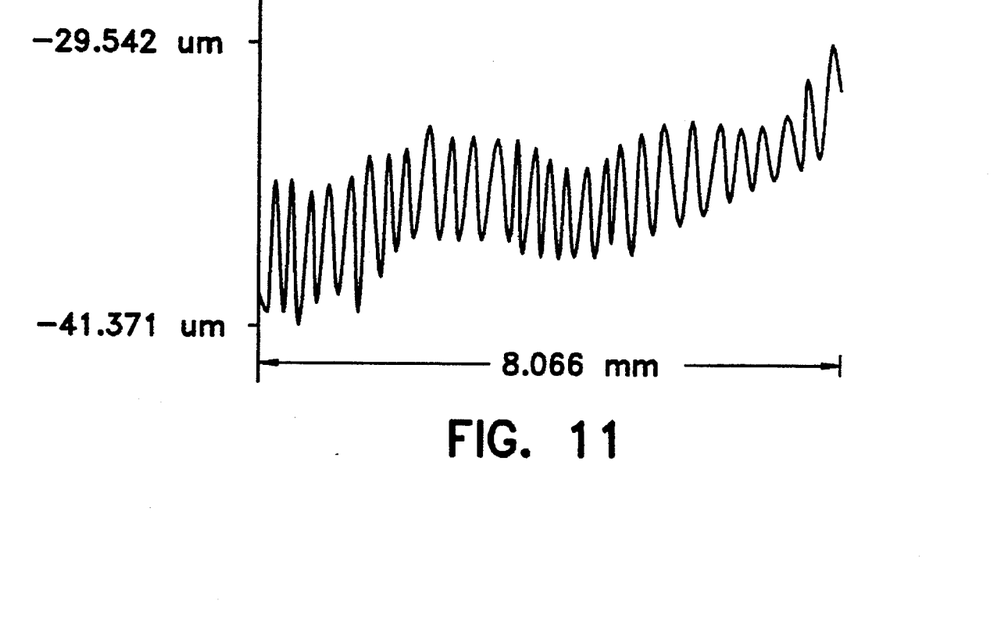
FIG. 11 is a Taylor-Hobson trace of the surface smoothness of a wafer produced by a conventional wiresaw cutting process.

In a conventional process, the nature of the surface finish depends upon the wire management scheme during the cutting process. One way wire movement is capable of producing a relatively homogeneous surface but shows the effect of wire wander where there are sudden changes in slope on the surface. Back and forth wire movement produces a series of discrete grooves corresponding to each change in wire direction. The groove depth is typically a few microns. A graph depicting the surface smoothness across these grooves produced by a conventional process with back and forth wire movement is shown in FIG. 11. The graph indicates a surface roughness measurement, by measuring between wafer surface peaks and valleys, of 4 to 5 micrometers.

Figure 12:
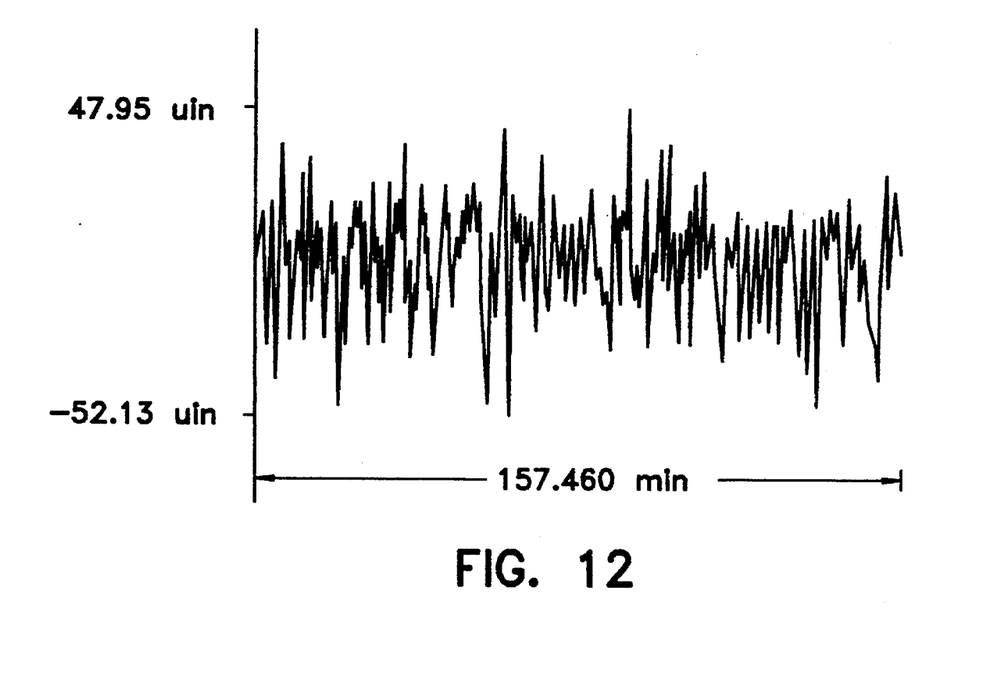
FIG. 12 is a Taylor-Hobson trace of the surface smoothness of a wafer produced by the process of the present invention.

In wiresaw cutting with a rotating workpiece, a homogeneous lapped surface can be produced with back and forth wire movement, for boule RPM's of >3. A surface roughness of 12.68 microinches (0.3 micrometers) was measured canasite (FIG. 12) using the Taylor-Hobson technique. This can be compared to the surface roughness depicted in FIG. 11, i.e., the surface roughness of a wafer produced by the conventional process, which has a surface roughness measurement an order of magnitude greater as compared to wiresaw cutting with a rotating workpiece.

Sensitivity to Boule Alignment

The conventional process has no particular requirement that the workpiece be aligned to the wire.

For wiresaw cutting with a rotating workpiece, there is a requirement that the axis of boule rotation be perpendicular to any given wire in the web as well as within a plane parallel to the web as a whole. However, misalignment in either of these planes does not show up in part geometry in a one to one correspondence. Intentional misalignment of the web relative to the boule axis produces a taper in the part approximately an order of magnitude less than would be expected by pure geometrical considerations. For example, a 1 mm misalignment over the 250 mm spacing of the wire guide would be expected to produce a 0.26 mm taper over a 65 mm diameter part. The observed taper is approximately 0.025–0.030 mm.

Sensitivity to Thermal Effects

In conventional wiresaw cutting, if the machine shuts down for any reason long enough tier it to cool down and thermally shift, the cut will reflect this as a surface step or irregularity, thereby mining the part. Wiresaw cutting with a rotating workpiece, however, is forgiving enough that such thermal upsets have no effect on the product. In some cases, the wiresaw cutting machine was shutdown due to mechanical problems. When the workpiece was removed and reinstalled several days later, the cut was completed successfully with measured dimensions similar to those observed in Table 2.

Sensitivity to Boule Rotational Speed and Direction

No differences in process or part quality was observed for boules rotating up to 60 RPM and either co- or counter-rotational wire direction; except, there was a slight suggestion of concentric rings over the surface when the RPM was less than 3 and the wire was moved back and forth.

Example 2

Experiments were run cutting various glass-ceramic materials with a wiresaw having a rotating workpiece. Data of surface flatness and TTV is shown in Table 3 below.

TABLE 3

| MATERIAL | TTV ± σ(μm) | FLATNESS ± σ(μm) |
|---|---|---|
| Composition 1 (CERAMMED) | 10 ± 2 | 4 ± 2 |
| Composition 2 (CERAMMED) | 6 ± 2 | 4 ± 2 |
| Composition 3 (GLASS) | 20 ± 3 | 12 ± 5 |
| Composition 3 (CERAMMED) | 18 ± 2 | 9 ± 1 |
| Composition 4 (CERAMMED) | 16 ± 2 | 7 ± 1 |

TABLE 3-continued

| MATERIAL | TTV ± σ(μm) | FLATNESS ± σ(μm) |
|---|---|---|
| Composition 5 | 6 ± 2 | 3 ± 2 |
| Composition 6 | 8 ± 2 | 4 ± 3 |

Composition 1 is a glass-ceramic containing lithium disilicate.

Composition 2 is a glass-ceramic containing spinel crystals of the composition 46.9% $SiO_2$, 24.8% $Al_2O_3$, 1–8% ZnO, 15% MgO, and 11.5% $TiO_2$.

Composition 3 is a glass-ceramic containing sappharine crystals of the composition 49.4% $SiO_2$, 24.5% $Al_2O_3$, 14% MgO, 7% $TiO_2$, 3.5% $ZrO_2$, 0.5% $As_2O_5$, and 1.4% $B_2O_3$.

Compositions 4 and 5 are glass-ceramics containing spinel crystals.

Composition 6 is a glass-ceramic containing 39.4% $SiO_2$, 30.7% $Al_2O_3$, 9.85 $TiO_2$, 8.22% MgO, 10.5% BaO, 0.14% SrO, and 1.11% ZnO.

Although the invention has been described in detail for the purpose of illustration, it is understood that such detail is solely for that purpose, and variations can be made therein by those skilled in the an without departing from the spirit and scope of the invention which is defined by the following claims.

What is claimed:

1. An apparatus for cutting a mass of material comprising:
   an elongate cutting wire;
   a first drive for moving the cutting wire along its length through a cutting location;
   a rotating mass holder for holding and rotating a longitudinally-extending mass of material, wherein the mass of material rotates about its longitudinal axis; wherein the mass holder comprises:
      a longitudinally-extending arbor having an exterior surface with a plurality of pins extending outwardly from the exterior surface and
      a sleeve configured to surround and slidably receive said arbor, said sleeve having a longitudinally-extending space to receive the plurality of pins and thereby prevent relative rotation between said arbor and said sleeve.

2. A method for cutting a mass of material, the mass of material having a longitudinal axis, said method comprising:
   mounting the mass of material on a rotatable mass holder, wherein the mass holder is comprised of a longitudinally-extending arbor having an exterior surface with a plurality of pins extending outwardly from the exterior surface and a sleeve configured to surround and slidably receive said arbor, said sleeve having a longitudinally-extending space to receive the plurality of pins and thereby prevent relative rotation between said arbor and said sleeve;
   moving an elongate cutting wire along its length through a cutting location;
   advancing either the mass of material toward the wire, the wire toward the mass of material, or both the wire and the mass of material toward one another, to orient the longitudinal axis of the mass of material at the cutting location in a position perpendicular to the wire for cutting the mass of material; and
   rotating the mass of material around its longitudinal axis, whereby the mass of material is cut.

3. A mass holder for holding material to be cut comprising:
   a longitudinally-extending arbor having an exterior surface with a plurality of pins extending outwardly from the exterior surface and
   a sleeve configured to surround and slidably receive said arbor, said sleeve having a longitudinally-extending space to receive the plurality of pins and thereby prevent relative rotation between said arbor and said sleeve.

4. A method for cutting a longitudinally-extending mass of material, having a longitudinal axis, comprising:
   moving an elongate cutting wire along its length through a cutting location;
   advancing either the mass of material toward the wire, the wire toward the mass of material, or both the wire and the mass of material toward one another, to orient the longitudinal axis of the mass of material at the cutting location in a position perpendicular to the wire for cutting the mass of material;
   rotating the mass of material around its longitudinal axis, whereby the mass of material is cut, wherein the mass of material is mounted for rotation on a mass holder comprising:
      a longitudinally-extending arbor having an exterior surface with a plurality of pins extending outwardly from the exterior surface and
      a sleeve configured to surround and slidably receive said arbor, said sleeve having a longitudinally-extending space to receive the plurality of pins and thereby prevent relative rotation between said arbor and said sleeve;
   continuing to cut the mass of material with the wire until the wire contacts the sleeve; and
   removing the material from the mass holder.

5. A method according to claim 4, wherein said removing comprises:
   separating the cut mass of material and the sleeve from the arbor and
   withdrawing the cut mass of material from the sleeve after said separating.

6. A wafer prepared by the process of claim 5.

7. A wafer according to claim 6, comprising a glass-ceramic material.

* * * * *

UNITED STATES PATENT AND TRADEMARK OFFICE
CERTIFICATE OF CORRECTION

PATENT NO. : 5,564,409

DATED : October 15, 1996

INVENTOR(S) : Bonzo et al.

It is certified that error appears in the above-identified patent and that said Letters Patent is hereby corrected as shown below:

Column 2, line 35, "In addition, some waists" should read --In addition, some wafers--.

Column 3, line 49, "curing location" should read --cutting location--.

Column 3, line 55, "at the curing location" should read --at the cutting location--.

Column 5, line 44, "from teed spool" should read --from feed spool--.

Column 6, line 59, "slurry S of curing" should read --slurry S of cutting--.

Column 10, line 33, "enough tier it to" should read --enough for it to--.

Column 10, line 35, "thereby mining the part" should read --thereby ruining the part--.

Signed and Sealed this

Thirty-first Day of December, 1996

Attest:

BRUCE LEHMAN

*Attesting Officer*  *Commissioner of Patents and Trademarks*